United States Patent
Blanchard et al.

(10) Patent No.: US 9,060,061 B2
(45) Date of Patent: *Jun. 16, 2015

(54) SYSTEM AND METHOD FOR PROMPT MODIFICATION BASED ON CALLER HANG UPS IN IVRS

(71) Applicant: AT&T Intellectual Property II, L.P., Atlanta, GA (US)

(72) Inventors: Harry E. Blanchard, Rumson, NJ (US); Steven H. Lewis, Middletown, NJ (US); Gregory Pulz, Cranbury, NJ (US); Lan Zhang, Malvern, PA (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,131

(22) Filed: Jun. 2, 2014

(65) Prior Publication Data

US 2014/0270117 A1    Sep. 18, 2014

Related U.S. Application Data

(63) Continuation of application No. 13/911,354, filed on Jun. 6, 2013, now Pat. No. 8,781,098, which is a continuation of application No. 13/402,958, filed on Feb. 23, 2012, now Pat. No. 8,488,771, which is a continuation of application No. 11/732,742, filed on Apr. 4, 2007, now Pat. No. 8,150,020.

(51) Int. Cl.
| | |
|---|---|
| H04M 11/00 | (2006.01) |
| H04M 3/51 | (2006.01) |
| G10L 15/22 | (2006.01) |
| H04M 3/493 | (2006.01) |

(52) U.S. Cl.
CPC ............. *H04M 3/5175* (2013.01); *G10L 15/22* (2013.01); *G10L 2015/227* (2013.01); *H04M 3/493* (2013.01); *H04M 2203/355* (2013.01); *H04M 2250/66* (2013.01)

(58) Field of Classification Search
CPC ..... H04M 3/493; H04M 3/5175; G10L 15/22
USPC ............................... 379/88.01, 265.01–265.3
See application file for complete search history.

(56) References Cited

U.S. PATENT DOCUMENTS

| | | |
|---|---|---|
| 5,829,000 A | 10/1998 | Huang et al. |
| 6,219,643 B1 | 4/2001 | Cohen et al. |

(Continued)

FOREIGN PATENT DOCUMENTS

WO    WO97/43756    11/1997

*Primary Examiner* — Sonia Gay

(57) ABSTRACT

In a method for use in Interactive Voice Response (IVR) systems, an IVR is configured such that voice prompts provided to a caller vary systematically and caller hang-up activity is attributed to the particular version of a prompt played to the caller. Voice prompt modifications are chosen based on how long the caller willingly listens to the voice prompt. A relatively short time listening to a prompt before hang-up, indicates dissatisfaction with that prompt. The system compares caller hang-up rates for each of the phrases in a prompt and chooses the optimum solution, which is the variant of the prompt with the longest caller listening time. Optionally, the system compares hang up rates to a threshold and contingent on that comparison chooses an alternative version of the prompt.

20 Claims, 3 Drawing Sheets

(56) References Cited

U.S. PATENT DOCUMENTS

| | | |
|---|---|---|
| 6,275,792 B1 | 8/2001 | Lewis |
| 6,363,347 B1 | 3/2002 | Rozak |
| 6,516,051 B2 | 2/2003 | Sanders |
| 6,697,460 B2 | 2/2004 | Knott et al. |
| 6,882,973 B1 | 4/2005 | Pickering |
| 6,904,143 B1 | 6/2005 | Peterson et al. |
| 6,937,983 B2 | 8/2005 | Romero |
| 7,493,260 B2 | 2/2009 | Harb et al. |
| 7,673,340 B1 | 3/2010 | Cohen et al. |
| 2003/0055623 A1 | 3/2003 | Epstein et al. |
| 2006/0069569 A1 | 3/2006 | Knott et al. |
| 2006/0106613 A1 | 5/2006 | Mills |
| 2007/0025528 A1 | 2/2007 | Knott et al. |
| 2008/0019496 A1 | 1/2008 | Taschereau |

SYSTEM AND METHOD FOR PROMPT MODIFICATION BASED ON CALLER HANG UPS IN IVRS

CROSS REFERENCE TO RELATED APPLICATIONS

This application is a continuation of copending U.S. patent application Ser. No. 13/911,354, filed Jun. 6, 2013, entitled "A System and Method for Prompt Modification Based on Caller Hang Ups in IVRs," issued as U.S. Pat. No. 8,781,098 on Jun. 15, 2014, which is a continuation of U.S. patent application Ser. No. 13/402,958, filed Feb. 23, 2012, entitled "A System and Method for Prompt Modification Based on Caller Hang Ups in IVRs," issued as U.S. Pat. No. 8,488,771 on Jul. 16, 2013, which is a continuation of U.S. patent application Ser. No. 11/732,742, filed Apr. 4, 2007, entitled "A System and Method for Prompt Modification Based on Caller Hang Ups in IVRs," issued as U.S. Pat. No. 8,150,020 on Apr. 3, 2012, the disclosures of which are incorporated herein by reference.

FIELD OF THE INVENTION

The invention relates generally to call centers or other call processing systems utilizing Interactive Voice Response applications to process calls or distribute calls among a number of service agents for handling. More particularly, the present application relates to the detecting of user hang ups early in the call, correlating the number of hang ups to the number of hang ups for various versions of the same prompt or series of prompts, providing analysis of the hang up data such as identifying where in the call users hang up, and automatically optimizing replacement prompt selection based on hang-up data.

BACKGROUND OF THE INVENTION

Interactive Voice Response (IVR) systems are computer-based telephony applications that answer calls from callers and, typically, attempt to automate calls or to route calls to appropriate human agents or other appropriate applications. Generally the system plays pre-recorded voice prompts to which a person responds by a) pressing a number on a telephone keypad to select an option, b) speaking simple answers such as "yes", "no", or numbers, c) speaking keyword responses to menus, or, even d) using unconstrained natural language in an open dialog.

Automatic call distributor (ACD) systems are often the first point of contact when calling many larger businesses, and can be used in place of more expensive IVR systems. An ACD is a telephone facility that manages incoming calls and handles them based on the number called and an associated database of handling instructions. Many companies offering sales and service support use ACDs to validate callers, make outgoing responses or calls, forward calls to the right party, allow callers to record messages, gather usage statistics, balance the queues of waiting calls to agent phone lines, and to provide other services.

IVR systems are used to create and manage services such as telephone banking, order placement, caller identification and routing, balance inquiry, and airline ticket booking IVR systems are generally used at the front end of call centers to identify which service the caller wants, to retrieve numeric information such as the caller's account numbers, and to provide answers to simple questions such as account balances or pre-recorded information.

IVR systems are often criticized as being unhelpful and difficult to use due to poor design and lack of appreciation of the callers' needs. A properly designed IVR system should connect callers to their desired service promptly and with a minimum of complexity.

When consumers access an IVR system while making a telephone call, many may hang up the call immediately, or hang up during the first few seconds, or a somewhat longer initial part of the call. In such instances a hang up could be motivated by impatience or the desire not to interact with an automated system. Often, however, a hang up is caused by the wording of the various prompts and announcements heard. Typically, the opening verbiage in an IVR can be thought of as a series of announcements, messages, or phrases that come prior to the actual prompt for user input. This verbiage is often a major factor in predicting whether a caller hangs up. When callers hang up during the initial prompts played by the IVR, the purpose of the IVR is undermined. The process of changing various IVR system components so as to minimize this hanging up behavior is currently completely manual.

As appreciated by those skilled in the art, tailoring prompts in applications based on user behavior is done while the IVR is not in use. The process requires an expert such as a VI (user interface) designer or systems analyst to examine places within prompts that exceed desired rates of users hanging up. The manual diagnostic process of having a person review data for initial hang-up rate as a function of prompt length is time consuming, costly, does not allow for prompt variants, and is inconvenient.

There therefore remains a need for a cost-effective technique to identify and resolve an initial hang up as a result of voice prompt, while minimizing the above-described disadvantages.

SUMMARY OF THE INVENTION

The present invention addresses the needs described above by providing a method and system for diagnosing and addressing caller events such as hang ups in IVR systems. One embodiment is a method for improving performance of an interactive voice response (IVR) system, the IVR system playing to callers a prompt containing a plurality of separate phrases. The method comprises the steps of measuring a caller event (e.g., hang up) rate of a test phrase in the prompt; measuring a caller event rate of an alternative to the test phrase in the prompt; comparing the caller event rate of the test phrase with the caller event rate of the alternative phrase, and replacing the test phrase contingent on the comparison.

The steps of measuring the caller event rates may further comprise the steps of calibrating a time of a caller event; and correlating the caller event to a phrase that was playing at the calibrated event time. The measuring steps may further comprise normalizing the caller event rate for a length of the phrase.

The two measuring steps may be performed simultaneously. The caller event rates may be measured by alternatively playing the test phrase and the alternative phrase, or by playing the phrases in random order, or by using alternative phrases in voice prompts in a predetermined pattern.

The contingency may further include a comparison of a calculated caller event rate to a predetermined threshold value caller event rate. The contingency in the method may be based on a selecting an alternative phrase with the lowest caller event rate.

The method may further comprise generating a report indicating which phrases in a prompt have unacceptable caller event rates.

Another embodiment of the invention is a method for improving the performance of an interactive voice response (IVR) system, the IVR system playing to callers a voice prompt containing a plurality of separate phrases. The method comprises the steps of setting a threshold hang up rate; selecting a voice prompt containing a test phrase; measuring a hang up rate of the test phrase; comparing the hang up rate of the test phrase with the threshold hang up rate; and replacing the test phrase contingent on the comparison.

Another embodiment of the invention is a system for improving a voice response (IVR) prompt. The system comprises at least one data base of stored voice prompts; an IVR application connected to the data base of stored voice prompts, the IVR application configured to a play voice prompt from the data base; a capture and tally engine configured for measuring a number of hang ups during playing of the voice prompts by the IVR and determining where in the call the hang up occurred; and, an analysis engine connected to the capture and tally engine for receiving and analyzing measured hang up rates, the analysis engine further connected to the IVR application for replacing the voice prompt with a different voice prompt from the database, based on the analysis of hang up rates.

The data base of stored voice prompts may include sequences of phrases.

The database may further comprise at least one alternative to at least one of the phrases. The alternative may be a variant based on at least one of content and length.

The capture and tally engine may attribute a caller hang up to a phrase of the voice prompt.

The capture and tally engine may attribute a hang up to a phrase by measuring how long into a voice prompt a hang up occurs.

The capture and tally engine may set a tunable parameter that compensates for a difference in time between a caller's actual hang up time and the system's record of the hang up time.

DESCRIPTION OF THE INVENTION

The invention is a method and a system for modifying voice announcements or other types of voice prompting in IVR environments such as call centers or other communication processing applications, based on data gathered from analysis of caller hang up data. This method enables optimization of IVR applications so as to minimize the rate of callers hanging up during the opening voice prompt.

Although the invention is described as it would apply to an IVR opening prompt, and caller hang up behavior, it could be extended to cover prompts anywhere in an IVR application and to other caller behavior, such as requests for human representatives. The disclosed techniques will be illustrated below in conjunction with the processing of calls in an exemplary IVR application. Those techniques, however, are not limited to use with any particular type of environment, call center, or communication processing application. For example, the invention is applicable to the processing of incoming communications, outgoing communications or both. The disclosed techniques can be used with ACD systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications.

The terms "voice prompting" and "voice prompts" as used herein are intended to include any type of audibly-perceptible information, including announcements, questions, directions, statements, etc., that may be presented to a caller accessing an IVR application. The voice prompt includes a series of phrases played serially to a caller. The initial prompt sequence refers to the first series of phrases played to the caller. Each phrase can have alternative forms. The terms "modified prompt" or "modified voice prompts" refers to variants of the voice prompt wherein a phrase or phrases differ from a base version.

Figure 1:
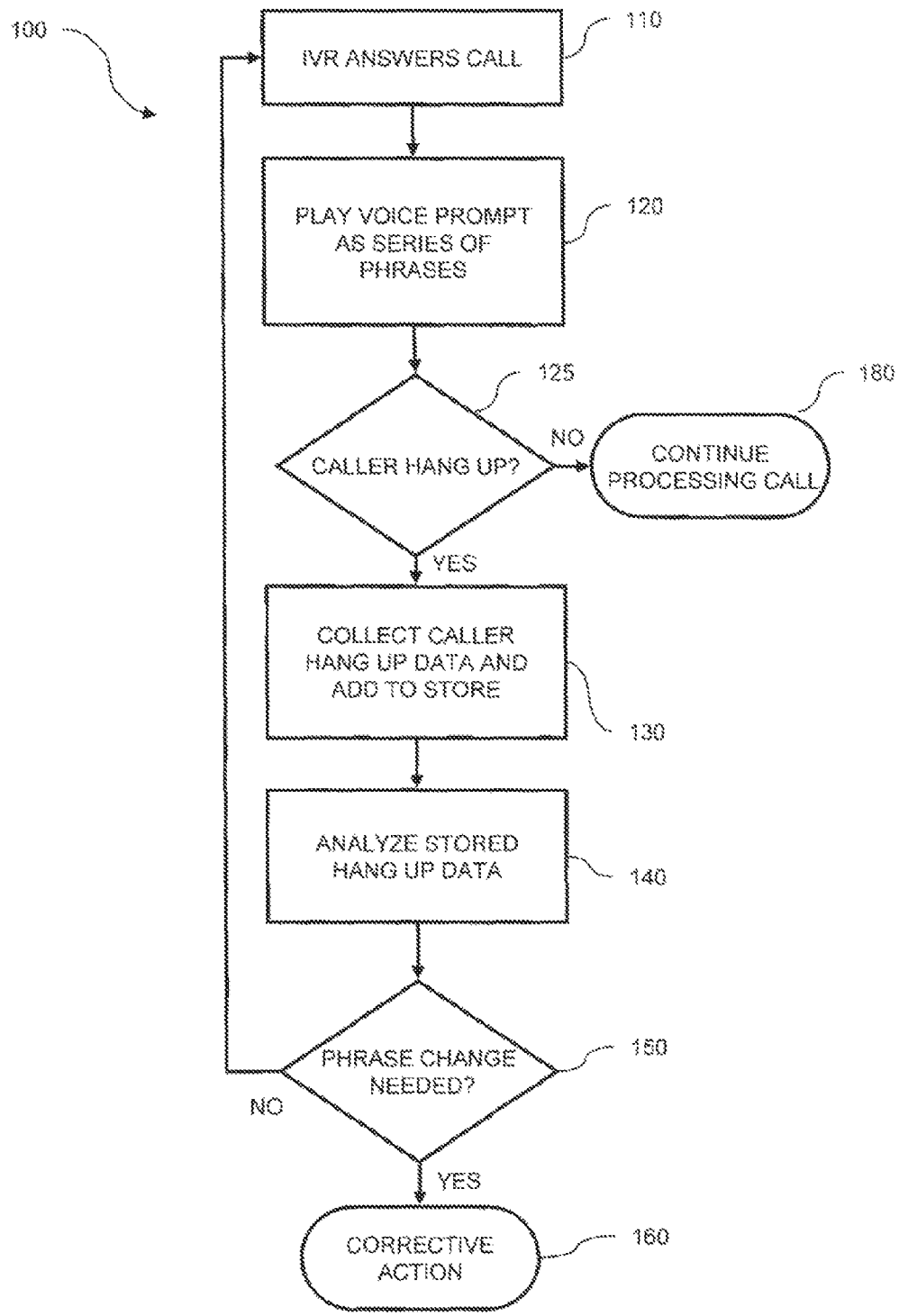
FIG. 1 is a flow chart depicting a method according to one embodiment of the invention.

FIG. 1 shows a flow diagram of a method 100 of prompt modification according to one embodiment of the invention. When an IVR answers a call (step 110), the system typically begins by playing audio recordings to the callers (step 120) consisting of greetings, announcements, instructions, menus, etc. This audio voice prompt or played announcement is composed of multiple phrases. Each phrase plays serially as in a paragraph read aloud. Although callers may experience this as if it were one (often long) message, the initial prompt sequence is several phrases strung together. As an example, an application's initial prompt sequence may be:

P1: "Acme Insurance National Claims Center.
P2: {In Spanish} For assistance in Spanish press 7.
P3: Calls are recorded' and monitored.
P4: I'm your automated assistant.
P5: Please tell me the reason for your call and I'll get someone to help you."

The invention represents the voice prompt sequence as a series, P1-P2-P3-P4-P5, where each numbered P corresponds to a sentence or sentence fragment, also referred to as a phrase in this description.

A caller event such as a caller hang up or a request to speak to a live person may occur at various points in IVRs, but, typically, the largest percentage of hang ups occurs during the initial prompt sequence, before the caller gives any input, be it speech or DTMF (touch tone) input. The method then detects (step 125) a caller event such as whether the caller decides to exit via an early hang up. If the caller does not hang up, the application continues according to the preprogrammed IVR sequence (step 180). In the case that the caller hangs up, the method collects caller data, including a timestamp of the hang up and stores this data (step 130) with data collected from previous caller hang ups during this prompt.

The method proceeds to analyze the collected data (step 140), comparing the running data from all the playings of the prompt. In (step 150) a threshold is checked to determine whether a change to a phrase is warranted. For example, the system of the invention may be configured to change a particular phrase if a caller event (e.g., hang up) rate for that phrase exceeds 20%. If no change is warranted, there is no action; however, if a change is warranted then corrective action 160 is taken. For example, the best alternative phrase is chosen based on which alternative phrase has the lowest hang up rate and the phrase is updated with the best alternative phrase.

Figure 2:
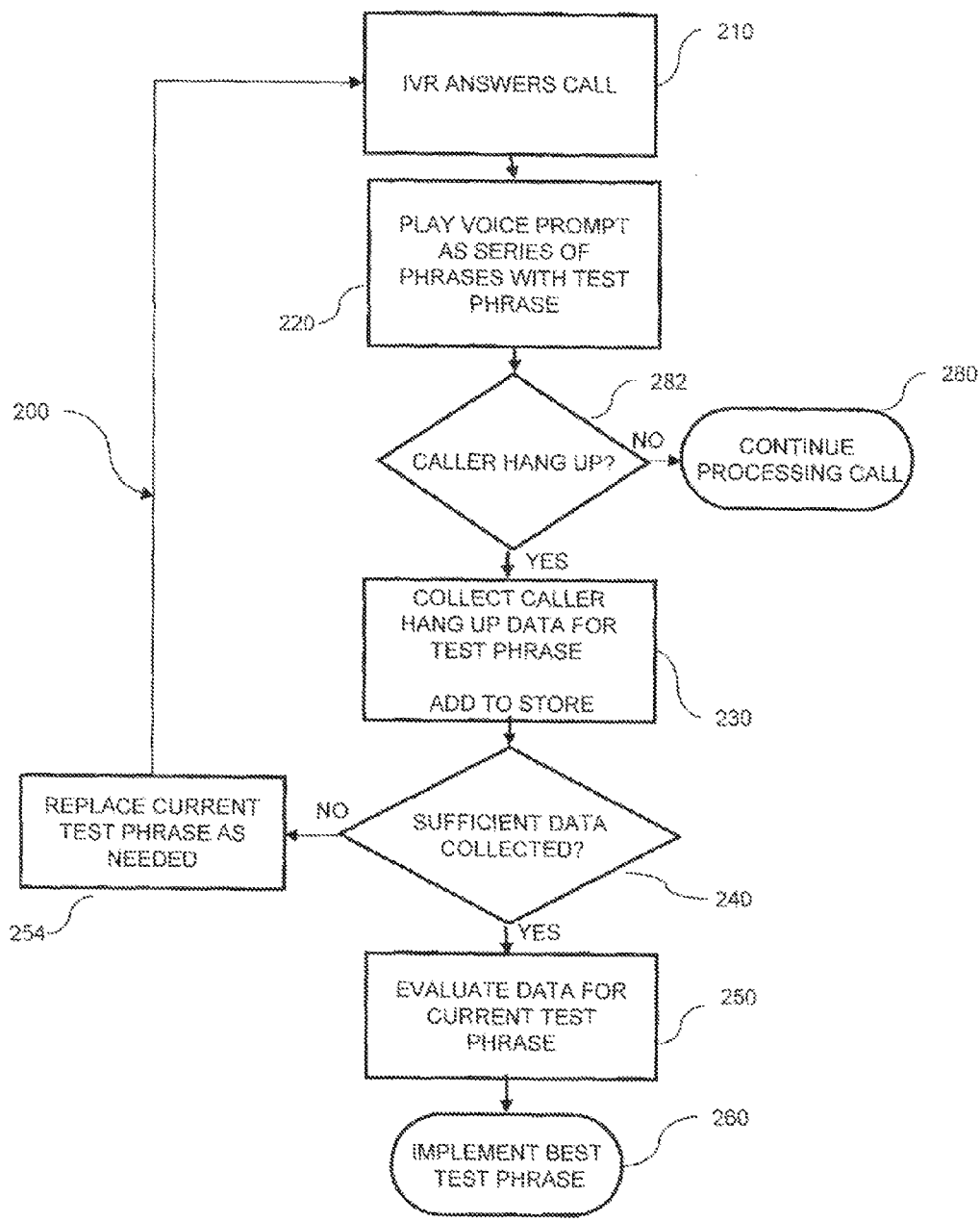
FIG. 2 is a flow chart depicting a method according to another embodiment of the invention.

FIG. 2 shows a flow diagram of a method of prompt modification 200 according to a second embodiment of the invention. The system has available one or more alternative phrases for the test phrase. The goal of this embodiment is to automatically evaluate each of the alternative phrases and to implement the best alternative. An advantage this embodiment provides is the capability to play alternative phrases sequentially and in other orders, for example, the IVR answers the first caller and plays voice prompt alternative 1; on the second call the IVR plays voice prompt alternative 2; and so forth, playing a next alternative voice prompt for each successive call into the IVR, up to the number of alternatives stored; optionally the IVR may play the alternatives in any pattern. Playing the voice prompt alternatives in such patterns, as opposed to gathering a complete data set on a first alternative, then a second, etc., eliminates systematic errors that might occur from callers hearing a voice prompt played at a certain time of day. For example, callers may be more likely to hang up when calling at lunch time than when calling at the end of the work day. Measuring the hang up rates simultaneously eliminates such errors.

In this embodiment, when an IVR answers a call (step 210), the system typically begins by playing audio recordings to the callers (step 220) including greetings, announcements, instructions, menus, etc. This audio voice prompt contains at least one test phrase. The test phrase (or phrases) is the phrase being considered for possible replacement by an alternative phrase. As in the first embodiment, the voice prompt is composed of multiple phrases. Each phrase plays serially as in a paragraph read aloud. The method provides for discovering an optimal voice prompt via the analysis and comparison of the hang up rates of one or more alternative phrases to a test phrase. An alternative voice prompt consists of multiple phrases with at least one phrase comprising a version differing from its test counterpart.

The method continues as the first embodiment. The method (step 282) detects whether the caller decides to exit via an early hang up. If the caller does not hang up, the application continues processing the call (step 280). In the case that the caller hangs up, the method collects caller data and stores this data (step 230) with previous caller data collected from hang ups during this prompt. For this embodiment data is continuously collected until there is a statistically significant amount.

In (step 240), the method checks whether a large enough sample has been collected. If the sample is not large enough, the next call will be answered using the same version of the voice prompt, or an alternative voice prompt, depending on the pattern chosen for testing phrases (step 254). When enough data has been collected, (step 250) analyzes the data for the current test phrase. The method then implements the best test phrase 260 based on an alternative phrase having the lowest hang up rate.

When a caller hangs up during the playing of the voice prompt, the system collects information about the call and the phrase being played at the time of hang-up. For example, the collected data may be a timestamp. Caller hang ups are given a timestamp in most IVRs. The timestamp marks the time the system records the disconnect. Because there is some small delay between the time a caller decides to hang up and the time the system records this as a disconnect, a calibration correction, or time shift, must be applied such that a certain constant would be subtracted from the call duration in order to map the hang up event to the actual phrase most likely to have been playing at the time a caller hung up. The constant may, for example, compensate for system processing times or may compensate for caller reaction times before hang ups, or may compensate for both of these.

Over a period of time, it is possible to record and analyze the timestamps associated with caller hang up behavior using a statistically large enough sample to draw confident conclusions.

Caller hang up frequencies may correlate with prompt length and these plots or histograms can be "normalized" into rates per unit of time. For example, a given prompt could be described as having a hang up rate of 1% of the calls per second of play time.

This invention improves over the historical method in that it can simultaneously monitor and trial multiple versions of a voice prompt in an IVR application. The method on initial deployment may include predetermined variants of one of the prompts, or may include variants of all of the prompts. In this case, prompt variants could be labeled as P1a, P1b, P1c, etc., where P1a would represent the first phrase of the prompt group and the first variant a, of that first prompt phrase. For illustration, with the insurance application used above as an example, collected call data revealed high rates of caller hang ups at P3 and P5, so trialing alternative prompts P3a, P3b, . . . P3n and P5a, P5b . . . P5n, in various combinations and permutations may produce an effective alternative to reduce hang ups in these phrases. The system could include instructions that would cause random or systematic combinations of the prompt variants to play and to collect the data necessary to analyze which prompt variant produced the lowest rate of hang ups.

In one embodiment of the invention, the system may trial randomly generated variants of the prompts, or play each variant for a certain number of times. The system may generate reports of the data to aid human experts in analysis and selection of the prompt variant.

As noted above, the invention need not be limited to IVR prompts that play at the beginning of a call sequence, but could be extended to prompts that play anywhere in the IVR call flow and sequence. Also, the invention need not be limited to caller hang up behavior, but could include other behaviors to minimize or maximize. A request to speak to a person is an example of these other behaviors.

This invention defines a way to tune the phrases in an initial voice prompt, based upon systematic analysis of hang up patterns at the beginning of an IVR application. The state of the art presently does not provide a practical solution to crafting and tuning appropriate phrases and or messages.

Figure 3:
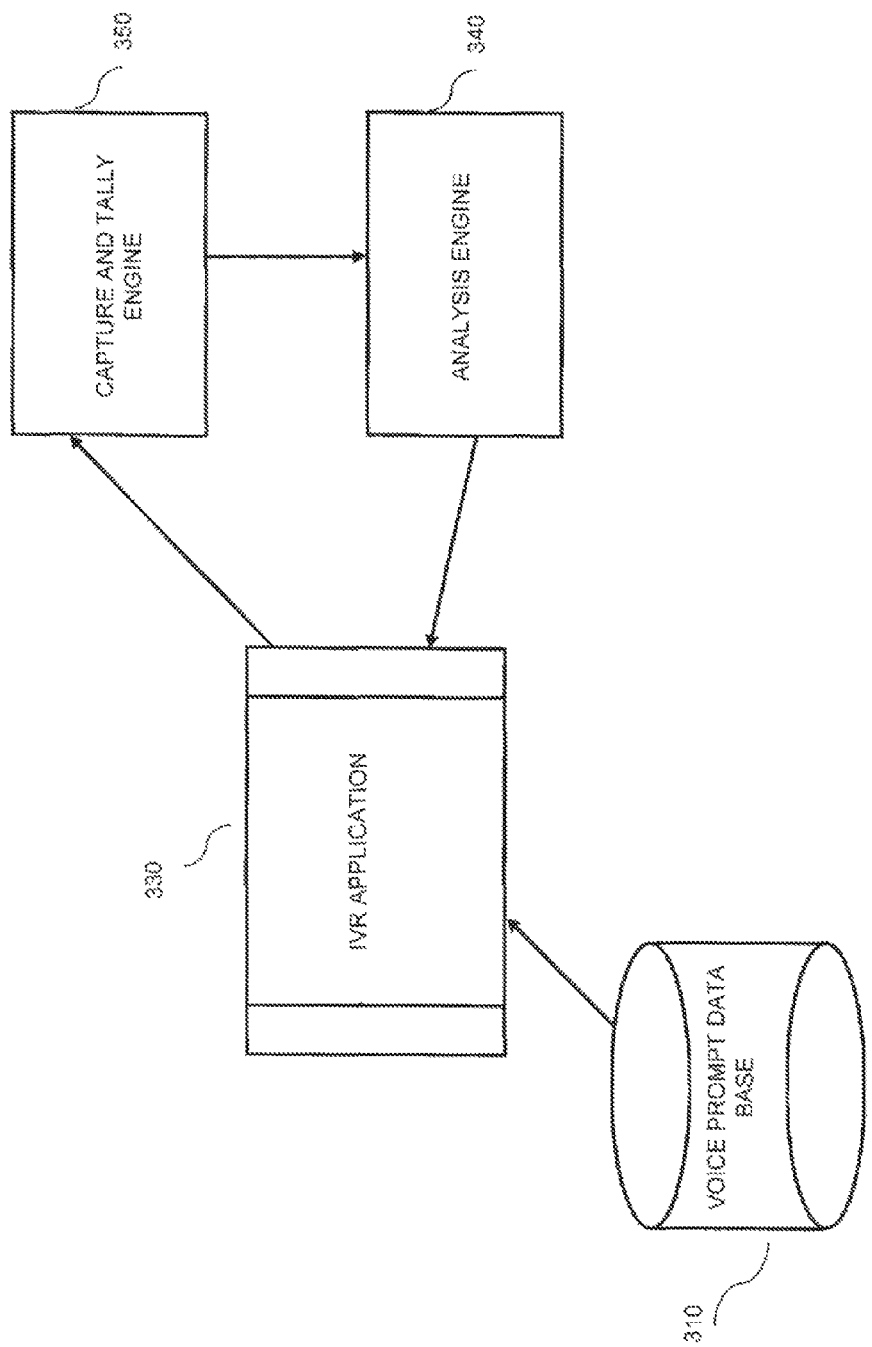
FIG. 3 is a schematic representation of a system according to one embodiment of the invention.

FIG. 3 depicts a schematic representation of a system according to one embodiment of the invention. An exemplary system includes an IVR application 330 connected to at least one 310 data base as a source of voice prompts. The data base 310 includes stored voice prompts, each voice prompt comprising of a sequence of initial greeting phrases, corresponding to what a caller would hear when they are connected to an application. The data base 310 also includes one or more alternatives to each voice prompt having at least one of the phrases differ from the stored voice prompts, where the alternatives can be variants based on content, length, etc.

IVR is also connected to an engine 350 containing logic for capturing and tallying the number of hang ups which occur during the playing of voice prompts, and determining where exactly in the playing of those announcements each caller hangs up. That engine 350 has access to prompt playing patterns to be used in capturing data. The system would further have the capability to specify a tunable parameter that defines a reaction-time lag to account for the difference in time between a caller's actual hang up time and the system's record of the hang up time.

The engine 340 is connected to the IVR, and may have the capability to provide analysis of the hang up data, such as hang up frequency per phrase, which voice prompt results in the most hang ups in a defined period, etc. In addition, the engine 340 sets thresholds such as parametric values for hang up rates to aid in the determination of whether a phrase change is needed.

Based on periodic analysis of the hang up data, the system allows choosing the most appropriate application messages, based on length, content, or other variants, in order to minimize the number of callers who hang up prior to providing any input to the IVR system.

The system's output could also be modified based on other analyses of the responses to the greeting: for example, 3-5% of calls are normally misdials. In this case, callers normally hang up from the system immediately. These quick exits could skew the results in a negative way and thus could be treated as noise and removed from the data analysis.

The invention improves the performance of IVRs, thereby providing information to callers in a timely fashion by increasing the likelihood that callers choose to remain on the call and complete their requests. Callers will be less likely to opt out of, or hang up on, an automated telephone system that has been well trialed and therefore delivers well tuned voice prompts.

The described system tunes the voice prompts in the IVR based on an analysis of when previous callers have abandoned the call. This invention results in increased customer satisfaction as evidenced by decreased hang ups and therefore decreased frustration with automated telephone systems. Completing the callers requests within the IVR system saves on the need for a human representative to handle the call.

This invention encompasses all of the needed functionality, as well as defines viable alternatives to the initial greeting in order to reduce the number of hang-ups. This includes the ability to accurately discern when the caller has actually hung up, as well as capture the non-zero time interval or length of the call associated with the hang up. The system has the capability to replace existing phrases with similar phrases that differ in various aspects such as brevity, speed or intonation.

The system and method of the invention provide an accurate and time-efficient way of enabling IVR service providers to provide higher quality service. Given the rapid increase in the use of IVR services, the method has great potential in future systems.

The method furthermore reduces the need for real-time human service provider support. It also requires no special knowledge of the callers or human interface designers; for example, the data collection and analysis are automatic. The method greatly reduces the time required to identify and correct a voice prompt problem in an IVR service.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to standalone IVR services, the method and apparatus of the invention may be instead embodied by call center or communications processing applications, for example. It is further noted that the invention is not limited to use with initial voice prompts, as described in this specification, but can be used with any outbound voice prompt, ACD, or telemarketing system, or communications system existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method for improving an effectiveness of an initial prompt sequence played by an interactive voice response system, the initial prompt sequence containing a plurality of separate phrases, the method comprising:
   creating an alternate prompt sequence to the initial prompt sequence, the alternate sequence containing an alternate phrase to a particular phrase of the plurality of separate phrases;
   selecting and playing for each of a plurality of callers a prompt sequence selected from the initial prompt sequence and the alternate prompt sequence, the selecting being according to a pattern of playings without gathering a complete data set on one of the prompt sequences before gathering data on the other, thereby avoiding systematic errors due to a time of day of a call;
   receiving indications of a plurality of caller events during playings of the prompt sequences, the indications including a plurality of timestamps of the plurality of caller events;
   automatically comparing an effectiveness of the particular phrase with an effectiveness of the alternate phrase based on mappings of the plurality of timestamps of the plurality of callers to the particular phrase and to the alternate phrase; and
   automatically replacing the particular phrase with the alternative phrase if the alternative phrase is more effective.

2. The method of claim 1 wherein the effectiveness of the particular phrase and the effectiveness of the alternate phrase are based on caller event rates determined as a number of caller events having timestamps mapped to the particular phrase and the alternate phrase.

3. The method of claim 2, further comprising:
   normalizing the caller event rates for lengths of the particular phrase and the alternate phrase.

4. The method of claim 1, wherein the plurality of caller events include a caller hang up and a caller request for a human operator.

5. The method of claim 1, further comprising:
   compensating the timestamps for a system processing time.

6. The method of claim 1, further comprising:
   compensating the timestamps for a caller reaction time.

7. The method of claim 1, wherein the pattern of playings comprises playing to alternate callers the initial prompt sequence and the alternative prompt sequence.

8. A non-transitory computer-readable medium having computer readable instructions stored thereon for improving an effectiveness of an initial prompt sequence played by an interactive voice response system, the initial prompt sequence containing a plurality of separate phrases, wherein execution of the computer readable instructions by a processor causes the processor to perform operations comprising:
   creating an alternate prompt sequence to the initial prompt sequence, the alternate sequence containing an alternate phrase to a particular phrase of the plurality of separate phrases;
   selecting and playing for each of a plurality of callers a prompt sequence selected from the initial prompt sequence and the alternate prompt sequence, the selecting being according to a pattern of playings without gathering a complete data set on one of the prompt sequences before gathering data on the other, thereby avoiding systematic errors due to a time of day of a call;

receiving indications of a plurality of caller events during playings of the prompt sequences, the indications including a plurality of timestamps of the plurality of caller events;

automatically comparing an effectiveness of the particular phrase with an effectiveness of the alternate phrase based on mappings of the plurality of timestamps of the plurality of callers to the particular phrase and to the alternate phrase; and automatically replacing the particular phrase with the alternative phrase if the alternative phrase is more effective.

9. The non-transitory computer-readable medium of claim 8 wherein the effectiveness of the particular phrase and the effectiveness of the alternate phrase are based on caller event rates determined as a number of caller events having timestamps mapped to the particular phrase and the alternate phrase.

10. The non-transitory computer-readable medium of claim 9, wherein the operations further comprise:
normalizing the caller event rates for lengths of the particular phrase and the alternate phrase.

11. The non-transitory computer-readable medium of claim 8, wherein the plurality of caller events include a caller hang up and a caller request for a human operator.

12. The non-transitory computer-readable medium of claim 8, wherein the operations further comprise:
compensating the timestamps for a system processing time.

13. The non-transitory computer-readable medium of claim 8, wherein the operations further comprise:
compensating the timestamps for a caller reaction time.

14. The non-transitory computer-readable medium of claim 8, wherein the pattern of playings comprises playing to alternate callers the initial prompt sequence and the alternative prompt sequence.

15. An interactive voice response system for improving an effectiveness of an initial prompt sequence played by an interactive voice response system, the initial prompt sequence containing a plurality of separate phrases, the interactive voice response system comprising a processor and a non-transitory computer-readable medium having computer readable instructions stored thereon, wherein execution of the computer readable instructions by the processor causes the processor to perform operations comprising:

creating an alternate prompt sequence to the initial prompt sequence, the alternate sequence containing an alternate phrase to a particular phrase of the plurality of separate phrases;

selecting and playing for each of a plurality of callers a prompt sequence selected from the initial prompt sequence and the alternate prompt sequence, the selecting being according to a pattern of playings without gathering a complete data set on one of the prompt sequences before gathering data on the other, thereby avoiding systematic errors due to a time of day of a call;

receiving indications of a plurality of caller events during playings of the prompt sequences, the indications including a plurality of timestamps of the plurality of caller events;

automatically comparing an effectiveness of the particular phrase with an effectiveness of the alternate phrase based on mappings of the plurality of timestamps of the plurality of callers to the particular phrase and to the alternate phrase; and automatically replacing the particular phrase with the alternative phrase if the alternative phrase is more effective.

16. The interactive voice response system of claim 15 wherein the effectiveness of the particular phrase and the effectiveness of the alternate phrase are based on caller event rates determined as a number of caller events having timestamps mapped to the particular phrase and the alternate phrase.

17. The interactive voice response system of claim 16, wherein the operations further comprise:
normalizing the caller event rates for lengths of the particular phrase and the alternate phrase.

18. The interactive voice response system of claim 15, wherein the plurality of caller events include a caller hang up and a caller request for a human operator.

19. The interactive voice response system of claim 15, wherein the operations further comprise:
compensating the timestamps for a caller reaction time.

20. The interactive voice response system of claim 15, wherein the pattern of playings comprises playing to alternate callers the initial prompt sequence and the alternative prompt sequence.

* * * * *